United States Patent
Fuchs et al.

(10) Patent No.: US 9,603,234 B2
(45) Date of Patent: Mar. 21, 2017

(54) DEVICE FOR MAGNETIZING LASER PLASMA BY MEANS OF A PULSED MAGNETIC FIELD

(71) Applicant: ECOLE POLYTECHNIQUE, Palaiseau (FR)

(72) Inventors: Julien Fuchs, Paris (FR); Bruno Albertaz, Fameck (FR); Henri Pepin, Pau (FR); Olivier Portugall, Lauzerville (FR); Jerôme Beard, Toulouse (FR)

(73) Assignee: ECOLE POLYTECHNIQUE, Palaiseau (FR)

( * ) Notice: Subject to any disclaimer, the term of this patent is extended or adjusted under 35 U.S.C. 154(b) by 0 days.

(21) Appl. No.: 14/771,023

(22) PCT Filed: Feb. 26, 2014

(86) PCT No.: PCT/FR2014/050418
§ 371 (c)(1),
(2) Date: Aug. 27, 2015

(87) PCT Pub. No.: WO2014/131994
PCT Pub. Date: Sep. 4, 2014

(65) Prior Publication Data
US 2016/0014875 A1    Jan. 14, 2016

(30) Foreign Application Priority Data

Feb. 27, 2013    (FR) ..................................... 13 51750

(51) Int. Cl.
*H05H 6/00*       (2006.01)
*G21B 3/00*       (2006.01)

(52) U.S. Cl.
CPC ............... *H05H 6/00* (2013.01); *G21B 3/006* (2013.01)

(58) Field of Classification Search
CPC .................................. H05H 6/00; G21B 3/006
USPC .......................................... 250/493.1, 504 R
See application file for complete search history.

(56) References Cited

U.S. PATENT DOCUMENTS

| 3,755,073 A | * | 8/1973 | Haught | .................... H05H 1/22 |
|---|---|---|---|---|
| | | | | 173/1 |
| 2005/0111624 A1 | | 5/2005 | Yada et al. | |
| 2005/0205810 A1 | * | 9/2005 | Akins | .................... B82Y 10/00 |
| | | | | 250/504 R |

(Continued)

FOREIGN PATENT DOCUMENTS

FR    2143239 A1    2/1973

OTHER PUBLICATIONS

Pisarczyk et al. "Formation of an elongated plasma column by a magnetic confinement of a laser-produced plasma." Laser and Particle Beams, vol. 10, No. 4, pp. 767-776, 1992.

(Continued)

*Primary Examiner* — Michael Maskell
(74) *Attorney, Agent, or Firm* — Oliff PLC

(57) ABSTRACT

A device for magnetizing laser plasma by unit of a pulsed magnetic field, which includes: a laser source for emitting a laser pulse; a vacuum chamber in which a target capable of generating a laser plasma during an interaction of the laser pulse with the target is arranged; and a coil capable of generating a pulsed magnetic field in the laser plasma, the device being characterised in that the coil is arranged in a reentrant chamber containing a coolant.

19 Claims, 2 Drawing Sheets

(56) References Cited

U.S. PATENT DOCUMENTS

| | | | | |
|---|---|---|---|---|
| 2006/0293644 | A1* | 12/2006 | Umstadter | A61B 18/24 606/10 |
| 2008/0083887 | A1* | 4/2008 | Komori | G21K 1/14 250/504 R |
| 2010/0176312 | A1* | 7/2010 | Komori | G03F 7/70033 250/504 R |
| 2014/0183379 | A1* | 7/2014 | Hori | H01S 3/10061 250/504 R |

OTHER PUBLICATIONS

Pisarczyk et al. "Influence of an External Strong Magnetic Field on Hydrodynamic Parameters and Radiation Emission of Laser Produced Plasma." Physica Scripta, vol. 50, No. 1, pp. 72-81, 1994.

Presura et al. "Megagauss Magnetic Fields for Magnetized Laser-Plasma Experiments." IEEE Transactions on Plasma Science, vol. 36, No. 1, pp. 17-21, 2008.

Sims et al. "Low-Noise Pulsed Pre-Polarization Magnet Systems for Ultra-Low Field NMR." IEEE Transactions on Applied Superconductivity, vol. 20, No. 3, pp. 752-755, 2010.

Tillack et al. "Magnetic Confinement of an Expanding Laser-Produced Plasma." Third International Conference on Inertial Fusion Sciences and Applications (IFSA 2003), pp. 319-322, La Grange Park, IL, USA, 2004.

Jun. 6, 2014 Search Report issued in International Application No. PCT/FR2014/050418.

Jun. 6, 2014 Written Opinion issued in International Application No. PCT/FR2014/050418.

Gotchev et al. "Laser-Driven Magnetic-Flux Compression in High-Energy-Density Plasmas." Physical Review Letters, vol. 103, 215004, 2009.

Toncian et al. "Ultrafast Laser-Driven Microlens to Focus and Energy-Select Mega-Electron Volt Protons." Science, vol. 312, pp. 410-413, Apr. 2006.

Oct. 9, 2016 Office Action issued in Chinese Patent Application No. 2014800239631.

* cited by examiner

DEVICE FOR MAGNETIZING LASER PLASMA BY MEANS OF A PULSED MAGNETIC FIELD

The present invention relates to devices for magnetizing laser plasmas with pulsed magnetic fields.

More particularly, the invention relates to a device for magnetizing a laser plasma with a pulsed magnetic field comprising a vacuum chamber, in which a target able to generate a laser plasma during an interaction of the target with a laser pulse is placed, and a winding that is powerable electrically in order to generate a pulsed magnetic field in the laser plasma.

It is known in the art that the interaction between a high-power laser pulse and a solid or gaseous target allows a plasma, commonly referred to as a laser plasma, to be generated. The generation of this plasma is accompanied by the emission of an intense beam of charged particles.

Such a beam has many applications, such as for example in the probing of physical effects, in inertial fusion or even in the generation of intense radiation.

To generate a laser plasma, the laser pulse must be of high intensity and focused on a focal spot of small transverse size on the target. It is therefore necessary to provide a vacuum chamber, at least in the terminal leg of the laser pulse, the high intensity and small transverse size of the pulse tending to ionize any gas that is located on its path, in particular ambient air, leading to the risk of damage to the laser optics, loss of power from the laser pulse and endangerment of personnel present in the vicinity.

Such intense beams of charged particles are usually highly divergent and it is desirable to be able to focus them in the aforementioned applications.

It is known that generating a high-strength pulsed magnetic field in a laser plasma allows the focus of the beams of charged particles to be improved, the charged particles then being subjected to a rotary movement about the magnetic field lines, this movement usually being characterized by a Larmor radius.

The document "Laser-driven Magnetic-Flux Compression in High-Energy-Density Plasmas" by O. V. Gotchev et al. (Physical Review Letters, vol. 103, 215004) describes an exemplary device for magnetizing a laser plasma with a pulsed magnetic field comprising coils placed in a vacuum chamber, on either side of and in very close proximity to the target, the coils thus being suitable for generating a magnetic field of 5 to 9 tesla in the target when a sufficiently large current, of about 80 kA, is made to flow therethrough.

Such devices have a number of drawbacks.

The heat produced by the flow of current through the coils leads to their destruction and it is therefore necessary to replace the coils each time the laser is fired. The rate at which the laser may be fired is therefore decreased.

The destruction of the coils may damage the optics for focusing the laser pulse, which are themselves also generally placed in the vacuum chamber, and at the very least implies frequent cleaning of the vacuum chamber.

Since the instantaneous magnetic field is determined by measuring the current flowing through the coils, then by applying a calculation taking account of the geometry of the coils, the gradual destruction of the coils as the magnetic field is generated makes the calculation of the magnetic field unreliable because the geometry of the coils changes over time in a way that is difficult to predict.

The maximum duration and strength of the pulsed magnetic field are limited by the destruction of the coils and it is difficult to generate pulsed magnetic fields of more than 10 tesla and of more than 300 nanoseconds with such a device.

The high currents flowing through the coils mean that electrical leads especially designed for vacuums ("vacuum feedthroughs") have to be used in order to prevent the electrical supplies of the coils generating electrical arcs in the vacuum chamber.

There is therefore a need for a device for magnetizing a laser plasma with a pulsed magnetic field that solves at least some of the aforementioned problems.

For this purpose, according to the invention, such a device for magnetizing a laser plasma with a pulsed magnetic field is characterized in that the winding is placed in a re-entrant chamber containing a cooling fluid.

By virtue of these arrangements, the device for magnetizing a laser plasma with a pulsed magnetic field may generate pulsed magnetic fields of more than 10 tesla, ranging up to 40 tesla and beyond, with durations of more than 300 nanoseconds, thereby allowing a beam of charged particles to be better focused. This focus may furthermore be kept stable for a long time.

The firing rate of the laser may be increased since it is no longer necessary to change elements of the winding after each firing of the laser.

The risk of damage to the optics, elements of the chamber and personnel is decreased.

The magnetic field generated in the laser plasma may be determined and controlled precisely and reliably.

It is not necessary to use special vacuum leads to supply the winding with power.

In preferred embodiments of the invention, recourse may optionally furthermore be made to one and/or other of the following arrangements:

- the re-entrant chamber comprises an axial vacuum through-duct comprising two axial ends, each of the axial ends being in communication with the vacuum chamber;
- the winding comprises at least one coil encircling the axial vacuum through-duct;
- the winding comprises two coils encircling the axial vacuum through-duct, said coils being separated by a central plate;
- the re-entrant chamber furthermore comprises at least one radial vacuum through-duct comprising two radial ends, each of the radial ends being in communication with the vacuum chamber;
- the radial vacuum through-duct is located in the central plate separating the two coils;
- the target is placed substantially in the middle of the winding;
- the target is placed substantially at one end of the winding;
- the cooling fluid is either a gas or a cryogenic fluid, in particular liquid nitrogen or liquid helium;
- the re-entrant chamber comprises a weakly conductive vacuum-resistant material, in particular a stainless steel;
- the pulsed magnetic field is a magnetic field the strength of which is higher than a few tesla, preferably higher than about ten tesla and preferably higher than forty tesla;
- the device furthermore comprises a laser source for emitting a laser pulse able to interact with the target in order to generate the laser plasma, and the laser pulse possesses a power substantially comprised between one gigawatt and one petawatt and especially between one terawatt and about one hundred terawatts;

the laser pulse possesses a duration substantially comprised between about ten femtoseconds and about ten nanoseconds and especially between about ten femtoseconds and about ten picoseconds.

Other features and advantages of the invention will become apparent from the following description of a plurality of embodiments thereof, which are given by way of nonlimiting example and with regard to the appended drawings.

In the drawings:

In the various figures, identical or similar elements are designated by the same references.

FIGS. 1 to 4 illustrate a device 1 for magnetizing a laser plasma with a pulsed magnetic field according to one embodiment of the invention.

Figure 1:
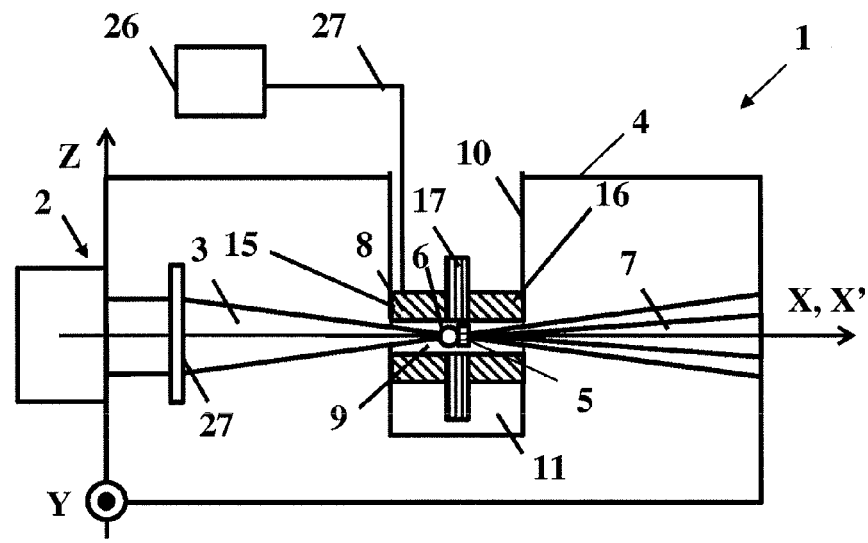
FIGS. 1 and 2 are schematic illustrations of a front and profile view of a device according to one embodiment of the invention.

Such a device 1 comprises a laser source 2. This laser source 2 is able to emit a laser pulse 3 that has a high power, for example comprised between one gigawatt and one petawatt (depending on whether the pulses are short or long) and especially between one terawatt and about one hundred terawatts per centimeter square when it is focused into a focal spot of small size, as detailed below.

This laser pulse 3 has a duration substantially comprised between about ten femtoseconds and about ten nanoseconds. It may for example have an energy of a few joules and a duration of a few nanoseconds.

In other embodiments, the intensity of the laser pulse may be lower, for example a few millijoules, and the duration of the laser pulse may also be shorter, for example a few femtoseconds.

The laser source 2 may comprise one or more laser oscillators and optical elements 27 such as for example lenses, crystals and/or gratings.

The laser pulse 3 propagates in a propagation direction X.

The device 1 comprises a vacuum chamber 4 in which a target 5 able to generate a laser plasma 6 during an interaction of the laser pulse 3 with the target 5 is placed.

The target 5 may be a solid, liquid or gaseous target, for example an aluminum film of 15 microns thickness, as described in "Ultrafast laser-driven microlens to focus and energy-select mega-electron volt protons" by T. Toncian et al. (SCIENCE, vol. 312, 21 Apr. 2006) and the references cited in this article.

It may extend substantially in a plane of extension YZ, for example a plane perpendicular to the propagation direction X.

An interaction between the pulse 3 and the target 5 may be obtained by focusing at least partially said pulse onto a front side of the target 5, by means of optical focusing devices, into a focal spot of small size, for example of about 6 microns full-width at half maximum (FWHM) intensity.

The laser pulse 3 creates a laser plasma 6 on the front side of the target by ionizing target atoms located in the focal spot.

The laser pulse 3 heats the target 5 and communicates to the electrons of said target a substantial amount of thermal energy that may cause some of said electrons to pass through the target and to escape therefrom via the back side, said back side being the side of the target opposite the front side in a thickness direction X' of the target, said thickness direction X' for example being substantially perpendicular to the plane of extension YZ of the target In one embodiment, the thickness direction X' of the target 5 and the propagation direction of the laser pulse X may be substantially collinear.

In another embodiment, the propagation direction X of the laser will possibly be inclined to the thickness direction of the target X', for example by 45° or more.

The laser pulse 3 therefore generates a movement of electrons through the thickness of the target 5 which forms a beam of electrons that is made to move substantially in the thickness direction X' of the target 5.

By extending out of the target on the back side, these electrons may create high electrical fields on said back side (of the order of one teravolt per meter).

These electrical fields may in particular be sufficiently strong to tear ions from the back side (for example impurities trapped on the opposite surface) and thus create a beam 7 of charged particles.

The energy of said charged particles (of charge typically of the order of a few picocoulombs to a few nanocoulombs) may for example be as high as sixty to one hundred megaelectronvolts and doses may for example be of the order of $10^{11}$ to $10^{13}$ particles per pulse. In the case of electrons (when gaseous targets are used) the energy may reach a few gigaelectronvolts.

One pulse of such a beam 7 may for example last less than a picosecond, i.e. substantially the duration of the first laser pulse, and the current generated may thus be about a few kiloamperes to a few hundred kiloamperes.

The beam of electrons made to move through the thickness of the generating target by the laser pulse may be divergent. The beam 7 of charged particles created may thus itself also be divergent.

It is thus necessary to focus said beam 7 of particles in order to be able to use it in a number of applications, including the aforementioned.

The device 1 thus also comprises a winding 8 (or electromagnet) able to generate a pulsed magnetic field 9 in the plasma laser 6.

The pulsed magnetic field 9 is a magnetic field the strength of which is higher than a few tesla.

Thus, for example in the example in FIG. 1, the strength of the pulsed magnetic field 9 is higher than about ten tesla and about forty tesla.

In this way, the focus of the beam 7 of particles is improved.

In the example in FIG. 1, the winding 8 is powered by a suitable electrical power supply 25, by means of a supply cable 27.

The electrical power supply 25 is for example able to deliver 30 to 50 kilojoules, by delivering a current of at least 50 kiloamperes, typically 100 kiloamperes, under a voltage of 16 kilovolts to the winding 8.

The winding 8 is placed in a re-entrant chamber 10 containing a cooling fluid 11.

The re-entrant chamber 10 is a chamber penetrating substantially into the interior of the vacuum chamber 4.

In FIG. 1, the re-entrant chamber 10 penetrates the vacuum chamber 4 in a vertical direction Z perpendicular to the propagation direction X.

Figure 2:
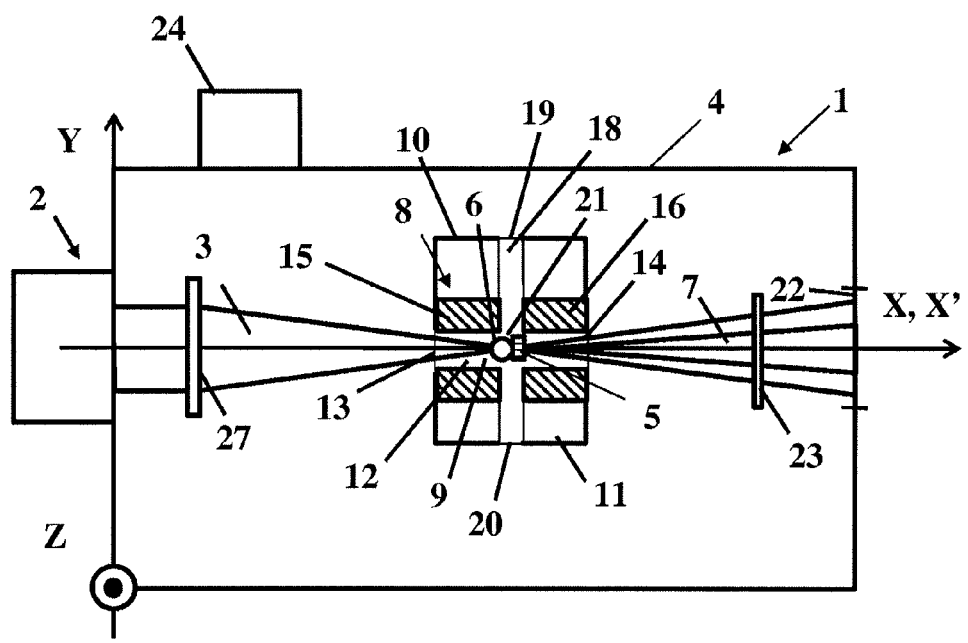

The cooling fluid 11 may be a gas such as for example air as in the embodiment in FIGS. 1 and 2.

Figure 3:
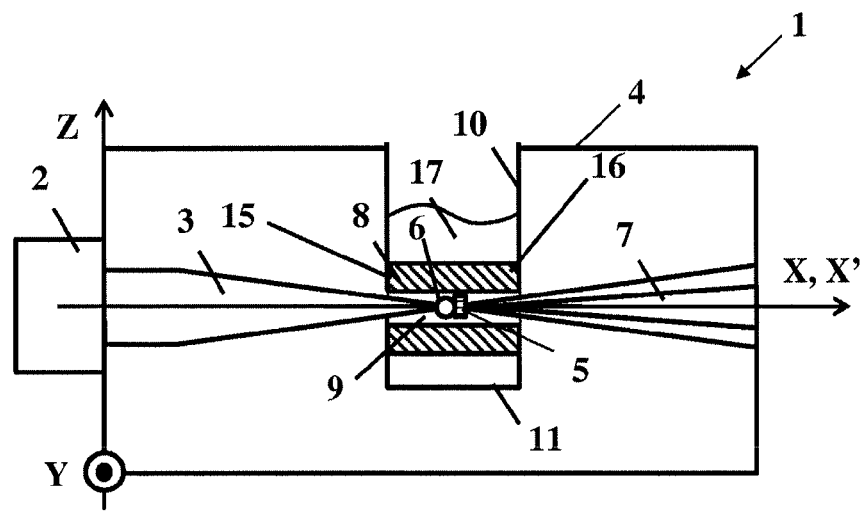
FIG. 3 is a schematic illustration of a device according to another embodiment of the invention.

In other embodiments, the cooling fluid 11 may be a cryogenic fluid such as for example liquid nitrogen or liquid helium as in the embodiment in FIG. 3. Any other liquid, water, solvents or oils of any type may be used whether making direct contact with the electromagnet or not.

The cooling fluid 11 may be placed so as to make contact with the winding 8 in order to allow the winding 8 to be cooled.

As a variant, a capillary tube, in which a second cooling fluid is made to flow, may be placed making contact with the winding 8.

In this variant embodiment, the re-entrant chamber may contain a cooling fluid 11 that is for example air.

In the embodiment illustrated in FIGS. 1 to 4, the target 5 is placed substantially in the middle of the winding 8.

As a variant, the target 5 may be placed substantially at one end of the winding 8. In this way the target 5 is more easily accessible.

In the embodiment in FIG. 1, the re-entrant chamber 10 comprises an axial duct 12.

The axial duct 12 is a vacuum through-duct.

It comprises two axial ends 13, 14, each in communication with the vacuum chamber 4.

In the example in FIG. 1, the axial duct 12 extends between its two axial ends 13, 14 substantially in the propagation direction X.

The axial duct 12 is placed in the vacuum chamber on the axis of the laser so as to be passed through by the laser pulse 3.

Thus, in the embodiment illustrated in FIG. 1, the target 5 is located in the axial duct 12 and for example located substantially in the middle of the axial duct 12.

In the example in FIG. 1, the winding 8 comprises two coils 15, 16 encircling the axial vacuum through-duct 12.

As a variant, a single coil 15 may be provided, as illustrated in the embodiment in FIG. 3.

In the embodiment in which two coils 15, 16 are provided, the coils may be separated by a central plate 17.

The central plate 17 is designed to contain the magnetic pressure generated by the winding 8.

The central plate 17 is for example made of stainless steel insulated by sheets of epoxy resin, for example sheets of epoxy resin adhesively bonded to one or both sides of a plate made of stainless steel.

The central plate may for example be located substantially in the middle of the axial duct 12.

The central plate may for example be located substantially level with the target 5

In one embodiment, more particularly illustrated in FIG. 2, the re-entrant chamber 10 furthermore comprises at least one radial vacuum through-duct 18.

The radial duct 18 comprises two axial ends 19, 20, each in communication with the vacuum chamber 4.

In the example in FIG. 1, the radial duct 18 extends between its two axial ends 19, 20 substantially in a transverse direction Y that is substantially perpendicular to the propagation direction and to the vertical direction Z.

In the embodiment in FIGS. 1 to 4, the radial duct 18 transects the axial duct 12 in a zone of intersection 21.

The radial duct 18 may for example be located substantially in the middle of the axial duct 12.

The radial duct 18 may for example be located substantially level with the target 5.

In the example in FIG. 1, the zone of intersection 21 is thus located substantially in the middle of the axial duct 12 and level with the target 5.

Figure 4:
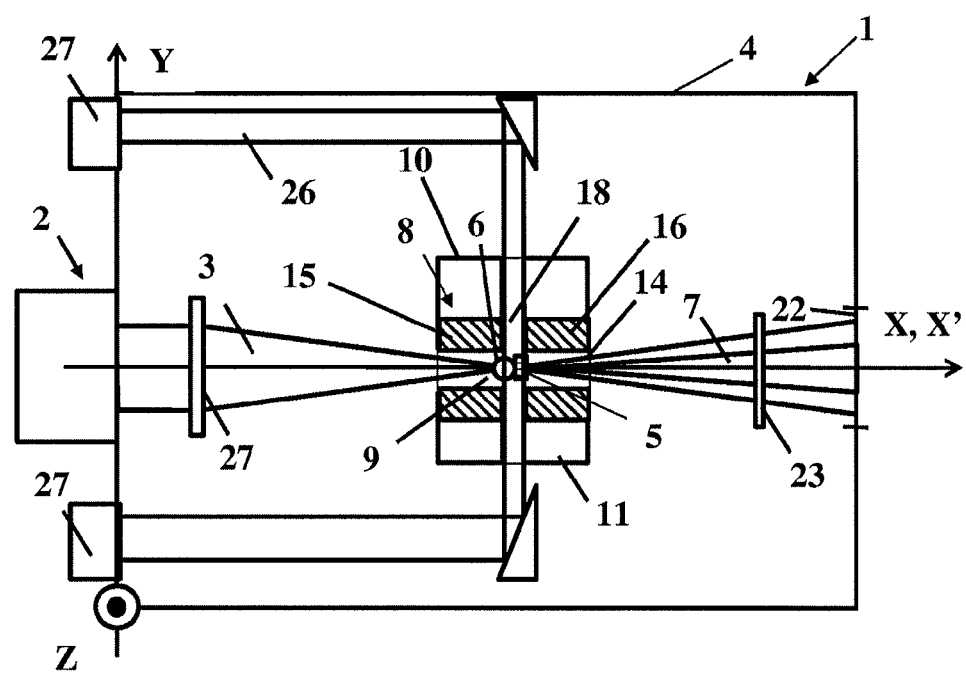
FIG. 4 is a schematic illustration of a device according to yet another embodiment of the invention.

In this way, a device 25 for diagnosing the laser plasma 6 may access the laser plasma by means of the radial duct 18, as illustrated in the embodiment in FIG. 4.

Such a diagnosing device 25 for example comprises at least one laser beam 26 able to pass through the laser plasma 6 and to be emitted and collected by modules 27.

In the embodiment illustrated in FIG. 1, the radial vacuum through-duct 18 is located in the central plate 17 separating the two coils 15, 16.

In this way, the magnetic discontinuity created by the radial duct 18 in the pulsed magnetic field is minimized.

The axial and radial ducts 12, 18 are dimensioned with diameters and angular apertures that are large enough to accommodate the spatial footprint of the one or more respective laser beams.

The elements of the re-entrant chamber 10, and especially the central plate G, are made, at least in part, from a material, possibly a composite, that is not, or not very, magnetic and that is mechanically strong enough to resist the magnetic pressure and the vacuum and sufficiently electrically non-conductive that losses due to induction are not excessively high—a stainless steel for example.

The vacuum chamber 4 may be equipped with a window 22 allowing said beam 7 of particles to exit the vacuum chamber.

The vacuum chamber 4 may be equipped with a collimator 23 allowing peripheral particles or radiation to be stopped at the exit of the device.

The vacuum chamber 4 may be equipped with a module for stopping radiation, for example comprising a material of high atomic number such as iron, lead or uranium.

The vacuum chamber 4 may also be equipped with a beam-deviating module allowing the beam of charged particles to be separated from radiation having a similar propagation direction, for example a magnetic-field-based deviating module.

The vacuum chamber 4 may be placed and kept under vacuum by means of one or more vacuum pumps 24.

The invention claimed is:

1. A device for magnetizing a laser plasma with a pulsed magnetic field, comprising:
   a vacuum chamber in which a target able to generate a laser plasma during an interaction of the target with a laser pulse is placed; and
   a winding that is powerable electrically in order to generate a pulsed magnetic field in the laser plasma,
   wherein the winding is placed in a re-entrant chamber containing a cooling fluid, and
   wherein the re-entrant chamber comprises an axial vacuum through-duct comprising two axial ends, the axial duct extending between its two axial ends in a propagation direction of the laser pulse, each of the axial ends being in communication with the vacuum chamber.

2. The device as claimed in claim 1, wherein the winding comprises at least one coil encircling the axial vacuum through-duct.

3. The device as claimed in claim 1, wherein the winding comprises two coils encircling the axial vacuum through-duct, said coils being separated by a central plate.

4. A device for magnetizing a laser plasma with a pulsed magnetic field, comprising:
   a vacuum chamber in which a target able to generate a laser plasma during an interaction of the target with a laser pulse is placed; and
   a winding that is powerable electrically in order to generate a pulsed magnetic field in the laser plasma,
   wherein the winding is placed in a re-entrant chamber containing a cooling fluid, and wherein the re-entrant chamber furthermore comprises at least one radial vacuum through-duct comprising two radial ends, each of the radial ends being in communication with the vacuum chamber.

5. The device as claimed in claim 4, wherein the winding comprises two coils encircling the axial vacuum through-duct, said coils being separated by a central plate, and wherein the radial vacuum through-duct is located in the central plate separating the two coils.

6. The device as claimed in claim 1, wherein the target is placed in the middle of the winding.

7. The device as claimed in claim 1, wherein the target is placed at one end of the winding.

8. The device as claimed in claim 1, wherein the cooling fluid is either a gas or a cryogenic fluid.

9. The device as claimed in claim 1, wherein the re-entrant chamber comprises a weakly conductive vacuum-resistant material.

10. The device as claimed in claim 9, wherein the re-entrant chamber comprises a stainless steel.

11. The device as claimed in claim 1, wherein the pulsed magnetic field is a magnetic field the strength of which is higher than a few tesla.

12. The device as claimed in claim 11, wherein the pulsed magnetic field is a magnetic field the strength of which is higher than ten tesla.

13. A device for magnetizing a laser plasma with a pulsed magnetic field, comprising:

a vacuum chamber in which a target able to generate a laser plasma during an interaction of the target with a laser pulse is placed; and
a winding that is powerable electrically in order to generate a pulsed magnetic field in the laser plasma,
wherein the winding is placed in a re-entrant chamber containing a cooling fluid, and
wherein the pulsed magnetic field is a magnetic field the strength of which is higher than forty tesla.

14. The device as claimed in claim 1, furthermore comprising a laser source for emitting a laser pulse able to interact with the target in order to generate the laser plasma, wherein the laser pulse possesses a power comprised between one gigawatt and one petawatt.

15. The device as claimed in claim 14, wherein the laser pulse possesses a power comprised between one terawatt and one hundred terawatts.

16. The device as claimed in claim 14, wherein the laser pulse possesses a duration comprised between ten femtoseconds and ten nanoseconds.

17. The device as claimed in claim 14, wherein the laser pulse possesses a duration comprised between ten femtoseconds and ten picoseconds.

18. The device as claimed in claim 15, wherein the laser pulse possesses a duration comprised between ten femtoseconds and ten nanoseconds.

19. The device as claimed in claim 15, wherein the laser pulse possesses a duration comprised between ten femtoseconds and ten picoseconds.

* * * * *